United States Patent
Byun (10) Patent No.: US 10,009,617 B2
(45) Date of Patent: Jun. 26, 2018

(54) METHOD OF OPERATING ENCODER AND METHOD OF OPERATING SYSTEM ON CHIP INCLUDING THE ENCODER

(71) Applicant: Samsung Electronics Co., Ltd., Suwon-si, Gyeonggi-do (KR)

(72) Inventor: Ju Won Byun, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 182 days.

(21) Appl. No.: 15/210,122

(22) Filed: Jul. 14, 2016

(65) Prior Publication Data

US 2017/0099492 A1 Apr. 6, 2017

(30) Foreign Application Priority Data

Oct. 6, 2015 (KR) ........................ 10-2015-0140111

(51) Int. Cl.
*H04N 19/196* (2014.01)
*H04N 19/172* (2014.01)
*H04N 19/174* (2014.01)
*H04N 19/182* (2014.01)
*H04N 19/169* (2014.01)

(52) U.S. Cl.
CPC ......... *H04N 19/198* (2014.11); *H04N 19/172* (2014.11); *H04N 19/174* (2014.11); *H04N 19/182* (2014.11); *H04N 19/1883* (2014.11); *H04N 19/1887* (2014.11)

(58) Field of Classification Search
CPC .. H04N 19/172; H04N 19/174; H04N 19/182; H04N 19/1883; H04N 19/1887; H04N 19/198; H04N 19/117; H04N 19/176; H04N 19/48; H04N 19/50; H04N 19/57
See application file for complete search history.

(56) References Cited

U.S. PATENT DOCUMENTS

| | | | |
|---|---|---|---|
| 9,161,035 B2 | 10/2015 | Maani et al. | |
| 2012/0287988 A1* | 11/2012 | Chong | H04N 19/105 375/240.02 |
| 2013/0114674 A1 | 5/2013 | Chong et al. | |
| 2013/0279569 A1 | 10/2013 | Gao et al. | |
| 2014/0146875 A1* | 5/2014 | Chong | H04N 19/159 375/240.02 |
| 2014/0185664 A1* | 7/2014 | Van Der Auwera | H04N 19/50 375/240.02 |
| 2014/0192891 A1 | 7/2014 | Alshina et al. | |

(Continued)

FOREIGN PATENT DOCUMENTS

| | | |
|---|---|---|
| JP | 2013251827 A | 12/2013 |
| KR | 20140005099 A | 1/2014 |

(Continued)

*Primary Examiner* — Anner N Holder
(74) *Attorney, Agent, or Firm* — Harness, Dickey & Pierce, P.L.C.

(57) ABSTRACT

A method of operating an encoder capable of predicting a band position and maximizing a compression ratio using variable length coding and a method of operating a system on chip (SoC) including the encoder are provided. The method includes determining a predicted band position of a first block included in a video frame, determining a first actual band position of the first block, and coding a difference value between the predicted band position and the first actual band position.

12 Claims, 8 Drawing Sheets

(56) References Cited

U.S. PATENT DOCUMENTS

| | | | |
|---|---|---|---|
| 2014/0348222 A1* | 11/2014 | Hsiang | H04N 19/176 |
| | | | 375/240.02 |
| 2014/0369429 A1 | 12/2014 | Laroche et al. | |
| 2015/0049806 A1* | 2/2015 | Choi | H04N 19/597 |
| | | | 375/240.12 |
| 2015/0071356 A1 | 3/2015 | Kim et al. | |
| 2015/0189301 A1 | 7/2015 | Endo | |
| 2015/0237376 A1 | 8/2015 | Alshina et al. | |
| 2015/0341641 A1* | 11/2015 | Kolesnikov | H04N 19/176 |
| | | | 375/240.02 |
| 2017/0155924 A1* | 6/2017 | Gokhale | H04N 19/63 |

FOREIGN PATENT DOCUMENTS

| | | |
|---|---|---|
| KR | 20140043037 A | 4/2014 |
| KR | 1493192 | 2/2015 |
| KR | 20150041772 A | 4/2015 |
| KR | 20150068921 A | 6/2015 |

* cited by examiner

| #BL | TYPE | BP_A |
|-----|------|------|
| BL1 | B0 | 7 |
| BL2 | E0 | - |
| BL3 | B0 | 4 |
| BL4 | B0 | 6 |
| BL5 | B0 | 11 |
| BL6 | E0 | - |
| BL7 | B0 | 10 |
| ⋮ | ⋮ | ⋮ |

| BP_DIF | Code | a number of bit(s) |
|---|---|---|
| 0 | 1 | 1 |
| 1 | 10 | 2 |
| -1 | 11 | 2 |
| 2 | 100 | 3 |
| -2 | 101 | 3 |
| 3 | 110 | 3 |
| -3 | 111 | 3 |
| 4 | 1000 | 4 |
| -4 | 1001 | 4 |
| ⋮ | ⋮ | ⋮ |

FIG. 9

METHOD OF OPERATING ENCODER AND METHOD OF OPERATING SYSTEM ON CHIP INCLUDING THE ENCODER

CROSS-REFERENCE TO RELATED APPLICATION

This U.S. non-provisional application claims the benefit of priority under 35 U.S.C. § 119(a) from Korean Patent Application No. 10-2015-0140111, filed on Oct. 6, 2015, at the Korean Intellectual Property Office (KIPO), the disclosure of which is hereby incorporated by reference in its entirety.

BACKGROUND

Example embodiments of the inventive concepts relate to a method of operating an encoder, and more particularly, to a method of operating an encoder capable of predicting a band position and increasing and/or maximizing a compression ratio using variable length coding in sample adaptive offset (SAO) for images and/or videos, and to a method of operating a system on chip (SoC) including the encoder.

With the development and propagation of hardware capable of playing and storing high-resolution or high-definition video content, need of video codec which codes or encodes the high-resolution or high-definition video content is increasing.

High efficient video coding (HEVC), a video compression standard, uses SAO in order to decrease and/or minimize an error between an original image and a restored image. The SAO may be divided into a band offset type and an edge offset type. In the band offset type, a band position value is coded as a parameter indicating the position of an offset band. Conventional video codecs use a fixed bit to code the band position. Such conventional video codec has a problem in terms of internal complexity and/or inefficient compression.

SUMMARY

Some example embodiments of the inventive concepts provide a method of operating an encoder capable of predicting a band position and increasing and/or maximizing a compression ratio using variable length coding and a method of operating a system on chip (SoC) including the encoder.

According to some example embodiments of the inventive concepts, there is provided a method of operating an encoder. The method includes determining, using the encoder, a predicted band position of a first block included in a video frame, determining, using the encoder, a first actual band position of the first block, and coding, using the encoder, a difference value of the predicted band position and the first actual band position.

The determining the predicted band position may include determining a second actual band position of a second block processed prior to a processing of the first block as the predicted band position. The second block may be closest to the first block based on an order of processing among one or more blocks processed prior to the processing of the first block.

Additionally, the determining the predicted band position may include determining the predicted band position using a mean value of actual band positions of one or more blocks processed prior to the first block.

Additionally, the determining the predicted band position may include dividing a full range of pixel values of the first block into a plurality of bands, calculating a frequency of a desired pixel value in each of the plurality of bands, and determining a band having a maximum frequency of the desired pixel value among the plurality of bands as the predicted band position.

Additionally, the determining the predicted band position may include determining the predicted band position using one of maximum, minimum, or mean values of at least one pixel value associated with the first block.

The coding the difference value may include coding the difference value using a first number of bits which is based on the difference value.

The method may further include determining, using the encoder, whether there is a second actual band position of a second block processed prior to the first block, and coding, using the encoder, the first actual band position in a second number of bits corresponding to a result of the determination of the second actual band position.

According to other example embodiments of the inventive concepts, there is provided a method of operating an encoder on a system on chip, the system on chip including the encoder and a processor. The method includes receiving, using the encoder, a video frame from the processor, the video frame including a first block and a second block, determining, using the encoder, a first band position of the first block, and coding, using the encoder, a difference value of a second band position of the second block and the first band position using a first number of bits, the first number of bits varying in accordance with the difference value. The method may further include coding, using the encoder, the first band position using a second number of bits.

When the first block is the second block, the determining the first band position may include predicting the first band position using one or more pixel values associated with the second block.

The predicting the first band position may be performed using at least one among a maximum value of the one or more pixel values, a minimum value of the one or more pixel values, a mean value of the one or more pixel values, and a frequency of a desired value among the one or more pixel values.

According to other example embodiments of the inventive concepts, there is provided a method of operating an encoder that includes receiving, using an encoder, at least one video frame, the at least one video frame including a plurality of blocks, calculating, using the encoder, a difference value between a current block of the plurality of blocks being processed and a first estimated block, generating, using the encoder, a residual block based on a result of the calculating, generating, using the encoder, a reconstructed current block based on the residual block and the first estimated block, deblocking, using the encoder, the reconstructed current block with a sample adaptive offset (SAO) filter, encoding, using the encoder, the quantized residual block using an entropy encoding scheme and at least one SAO parameter, and transmitting, using the encoder, the encoded block as an encoded image.

The calculating may further include generating, using the encoder, motion estimation information regarding at least one previously processed block of the plurality of blocks, and transmitting, using the encoder, the at least one previously processed block of the plurality of blocks as the first predicted block.

The motion estimation information may include position information of a second block of the plurality of blocks, the second block corresponding to the first block according to a desired criterion.

The generating the reconstructed current block may include transforming, using the encoder, the residual block into a frequency domain, quantizing, using the encoder, the transformed residual block, generating, using the encoder, the restored residual block based on the quantized residual block, and reconstructing, using the encoder, the current block based on the restored residual block and the first estimated block.

The difference value may correspond to a difference in an actual band position value of the current block and an estimated band position value of the first estimated block.

The difference value may be encoded using a variable length coding scheme.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms first, second, etc. may be used herein to describe various elements, these elements should not be limited by these terms. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
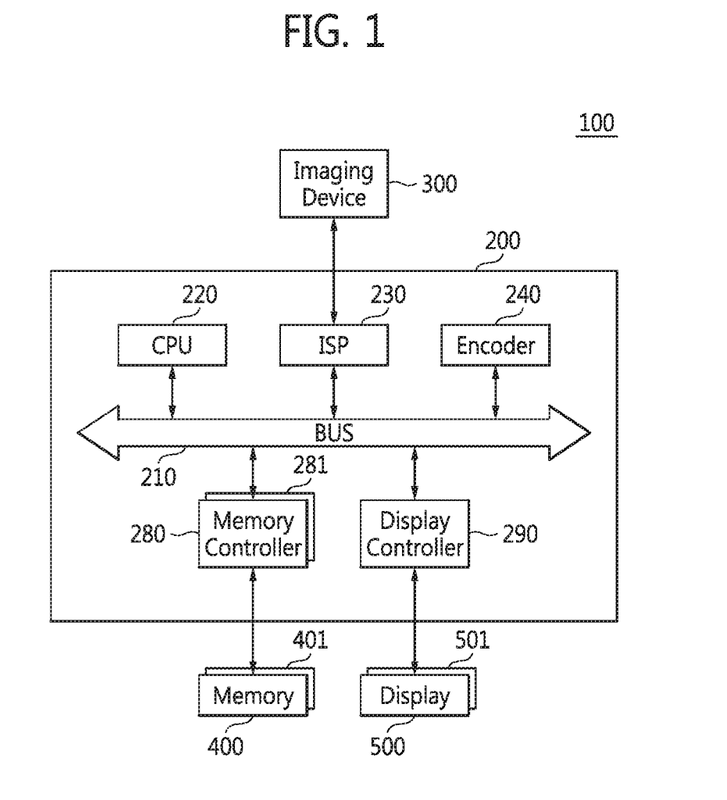
FIG. 1 is a block diagram of a data processing system according to some example embodiments of the inventive concepts.

FIG. 1 is a block diagram of a data processing system 100 according to some example embodiments of the inventive concepts. The data processing system 100 may include a controller 200, an imaging device 300, at least one memory 400 and/or 401, and at least one display 500. The data processing system 100 may also include a touch screen 501. The data processing system 100 may be implemented as a personal computer, a television, and/or a mobile computing device, etc. The mobile computing device may be implemented as a laptop computer, a cellular phone, a smart phone, a tablet, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, and/or an e-book, etc., but the inventive concepts are not restricted to these examples.

The controller 200 may control the operations of the imaging device 300, the at least one memory 400 and/or 401, and the display 500. The controller 200 may also control the operation of the touch screen 501. The controller 200 may be implemented as an integrated circuit (IC), a mother board, a system on chip (SoC), an application processor (AP), or a mobile AP, but the inventive concepts are not restricted to these examples.

The controller 200 may include bus architecture 210, at least one central processing unit (CPU) 220, an image signal processor (ISP) 230, an encoder 240, at least one memory controller 280 and/or 281, and a display controller 290. The bus architecture 210 may be implemented as advanced microcontroller bus architecture (AMBA), an advanced high-performance bus (AHB), an advanced peripheral bus (APB), an advanced extensible interface (AXI), an AXI coherency extensions (ACE), an advanced system bus (ASB), etc., but the inventive concepts are not restricted to these examples.

The CPU 220 may control the operations of the ISP 230, the encoder 240, the at least one memory controller 280 and/or 281, and the display controller 290 through the bus architecture 210. The CPU 220 may be a processor which includes at least one core and/or may be more than one processor, a distributed processing system, etc.

The ISP 230 may control the transformation of a format of image data output from the imaging device 300, noise reduction for the image data, and/or image enhancement of the image data. In detail, the ISP 230 may transform first image data in a first format, which has been output from the imaging device 300, into second image data in a second format. The first format may be a Bayer format and the second format may be a YUV format, a YCbCr format, or an RGB format; however, the inventive concepts are not restricted these examples.

Although the ISP 230 is formed within the controller 200 in the example embodiments illustrated in FIG. 1, the ISP 230 may be formed in an independent semiconductor chip between the controller 200 and the imaging device 300 in other example embodiments. When the ISP 230 is placed within the imaging device 300, a complementary metal oxide semiconductor (CMOS) image sensor chip, or other image sensor chip such as a charge-couple device (CCD) image sensor chip, and the ISP 230 may be packaged into a single package, e.g., a multi-chip package (MCP) within the imaging device 300 in further example embodiments. However, the type of package is not restricted to the MCP according to various other example embodiments.

The encoder 240 may receive image data from the ISP 230 and encode the image data. Encoded image data (e.g., an encoded bitstream) may be stored in the at least one memory 400 and/or 401 through the at least one memory controller 280 and/or 281. The encoder 240 may support high efficiency video coding (HEVC) standards, but the inventive concepts are not restricted to this example. The structure and operations of the encoder 240 will be described in detail with reference to FIGS. 2 through 9 later.

The at least one memory controller 280 and/or 281 may control a data access operation on the at least one memory 400 and/or 401 according to the control of the CPU 220. The data access operation may include a write operation for wiring data to the memory 400 and a read operation for reading data from the memory 400.

The at least one memory 400 and/or 401 may include either or both of volatile memory and non-volatile memory. The volatile memory may be, for example, random access memory (RAM), dynamic RAM (DRAM), static RAM (SRAM), buffer memory, etc. The non-volatile memory may be, for example, flash memory, magnetic RAM (MRAM), spin-transfer torque MRAM, ferroelectric RAM (FeRAM), phase-change RAM (PRAM), resistive RAM (RRAM), Solid State Disk (SSD) drive, hard disk drive, etc. The flash memory may be NAND-type or NOR-type flash memory that stores at least one bit. The controller 200 and the memory 400 may be packaged using package-on-package (PoP) or system-in-package (SiP).

The display controller 290 may transmit image data from the CPU 220, the encoder 240, and/or the display controller 290 to the display 500 according to the control of the CPU 220.

The imaging device 300 may be a camera, a CMOS image sensor, a CMOS image sensor chip, and/or any device which can generate image data. The imaging device 300 may include a CMOS image sensor chip, or other image sensor chip, which can generate image data. The CMOS image sensor chip may output image data corresponding to an optical image of an object to the ISP 230. The imaging device 300 may output image data to the ISP 230 through a first serial interface, e.g., mobile industry processor interface (MIPI®) camera serial interface (CSI), USB interface, Firewire interface, PCI Express interface, etc.

The display 500 may display image data output from the display controller 290. The controller 200 may transmit image data to the display 500 through a second serial interface, e.g., MIPI® display serial interface (DSI), USB interface, Firewire interface, PCI Express interface, HDMI interface, DVI interface, VGA interface, etc.

Figure 2:
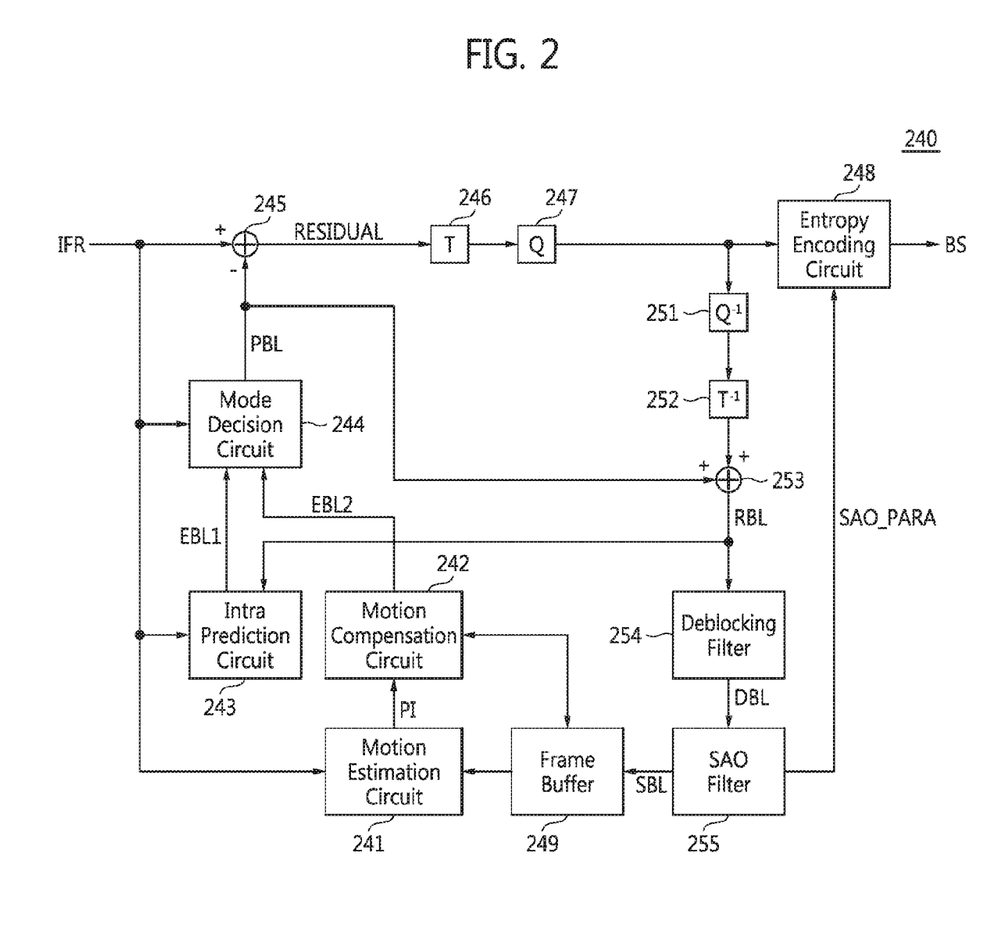
FIG. 2 is a block diagram of an encoder illustrated in FIG. 1 according to some example embodiments.
Figure 3:
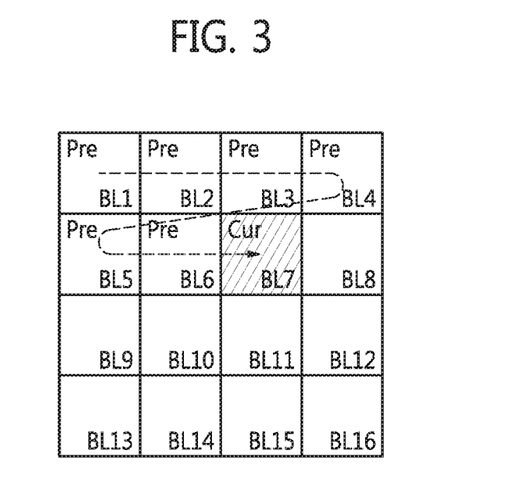
FIG. 3 is a diagram of a video frame processed in the encoder illustrated in FIG. 1 according to some example embodiments.

FIG. 2 is a block diagram of the encoder 240 illustrated in FIG. 1. FIG. 3 is a diagram of a video frame (e.g., an image frame) processed in the encoder 240 illustrated in FIG. 1. Referring to FIGS. 2 and 3, the encoder 240 may process an input video frame IFR block by block. The video frame IFR may include a plurality of blocks. Although the video frame IFR is divided into 16 blocks BL1 through BL16 in the example embodiments illustrated in FIG. 3, the video frame IFR may be divided into different numbers of blocks in different example embodiments.

The video frame IFR may be a frame in a YUV format, a frame in a YCbCr format, a YPbPR format, a HSL format, a CMYK format, or a frame in an RGB format, but the inventive concepts are not restricted to these examples. A block may include m*n pixels, where "m" and "n" may be natural numbers of at least 2 and it may be that m=n or m≠n. The block may include 16*16 pixels, 32*32 pixels, or 64*64 pixels, but the inventive concepts are not restricted to these examples.

The encoder 240 may include a motion estimation circuit 241, a motion compensation circuit 242, an intra prediction circuit 243, a mode decision circuit 244, a subtractor 245, a transform circuit 246, a quantization circuit 247, an entropy encoding circuit 248, a frame buffer 249, an inverse quantization circuit 251, an inverse transform circuit 252, an adder 253, a deblocking filter 254, and a sample adaptive offset (SAO) filter 255.

The intra prediction circuit 243 may receive a current object of processing, i.e., a current block BL7, and a reconstructed current block RBL and may transmit a block that has been predicted and/or estimated using the reconstructed current block RBL to the mode decision circuit 244 as a first predicted block EBL1. Accordingly, the first predicted block EBL1 may be a block predicted and/or estimated using a current frame.

The motion estimation circuit 241 may receive the current block BL7 and may transmit motion estimation information regarding the current block BL7 to the motion compensation circuit 242. In detail, the motion estimation information may be position information PI of a block that matches the current block BL7 a desired amount, such as a desired threshold level, the most, etc., among previous blocks included in a previous frame stored in the frame buffer 249. In other words, the motion estimation information may relate to position information PI of a second block that satisfies a desired criterion when compared to the current block, such as a desired threshold value, a direct image comparison of the two blocks, etc.

The motion compensation circuit 242 may receive the position information PI, may read a block corresponding to the position information PI from the frame buffer 249, and may transmit the block to the mode decision circuit 244 as a second predicted block EBL2. The second predicted block EBL2 may be a block predicted and/or estimated based on one or more of the previous frames.

The mode decision circuit 244 may receive the current block BL7, the first predicted block EBL1, and the second predicted block EBL2. The mode decision circuit 244 may output either the first predicted block EBL1 or the second predicted block EBL2 as a predicted and/or estimated block PBL based on received inputs and/or command signals.

The subtractor 245 may calculate a difference between the current block BL7 and the predicted block PBL output from the mode decision circuit 244. The subtractor 245 may then generate a residual block RESIDUAL corresponding to the calculation result. The subtractor 245 may calculate a difference in units of calculation blocks and may output the residual block RESIDUAL in units of blocks. For instance, when each calculation block includes 4*4 pixels, each block may include 16*16 pixels, but the inventive concepts are not restricted to this example.

The transform circuit 246 may transform the residual block RESIDUAL output from the subtractor 245 into a frequency domain and output a transformed residual block to the quantization circuit 247. The quantization circuit 247 may quantize the transformed residual block output from the transform circuit 246 and may output quantized residual block to the entropy encoding circuit 248 and the inverse quantization circuit 251.

The entropy encoding circuit 248 may encode the quantized residual block output from the quantization circuit 247 and a SAO parameter SAO_PARA output from the SAO filter 255 using an entropy encoding scheme and may output an encoded bitstream BS to the bus 210.

The inverse quantization circuit 251 may inverse-quantize the quantized residual block output from the quantization circuit 247 and may output an inverse-quantized residual block to the inverse transform circuit 252. The inverse transform circuit 252 may inverse-transform the inverse-quantized residual block and may generate a restored residual block.

The adder 253 may add the restored residual block output from the inverse quantization circuit 251 and the predicted block PBL output from the mode decision circuit 244 to generate the reconstructed current block RBL. The reconstructed current block RBL may be output to the deblocking filter 254 and the intra prediction circuit 243.

The deblocking filter 254 may perform filtering on pixels at the boundary of the reconstructed current block RBL output from the adder 253 in order to reduce a blocking effect. The SAO filter 255 may perform offset compensation on a current block that has been subjected to deblocking in order to decrease and/or minimize an error between an original pixel and a restored pixel. A current block that has been subjected to the offset compensation may be stored in the frame buffer 249.

Figure 4:
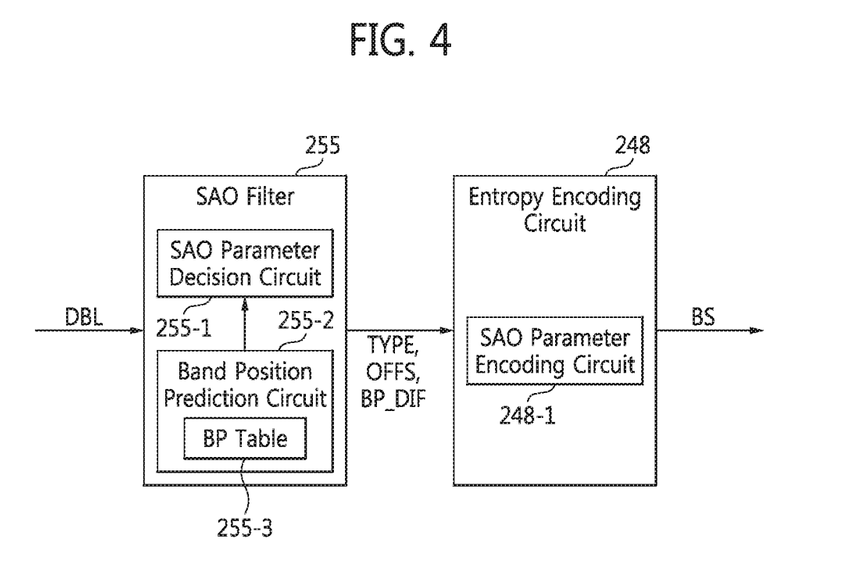
FIG. 4 is a detailed block diagram of a sample adaptive offset (SAO) filter and an entropy encoding circuit illustrated in FIG. 2 according to some example embodiments.
Figure 5:
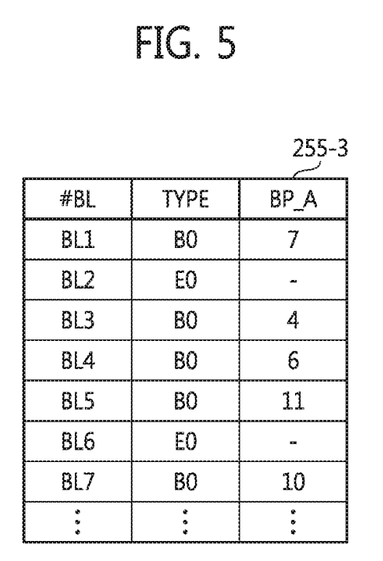
FIG. 5 is a table showing the SAO type and actual band position of each block included in a video frame according to some example embodiments of the inventive concepts.

FIG. 4 is a detailed block diagram of the SAO filter 255 and the entropy encoding circuit 248 illustrated in FIG. 2 according to at least one example embodiment. FIG. 5 is a table showing the SAO type and the actual band position of each block included in an image and/or video frame according to some example embodiments of the inventive concepts.

Referring to FIG. 4, the SAO filter 255 may determine SAO parameters, e.g., a SAO type TYPE, an offset OFFS, a difference value BP_DIF based on or between an actual band position BP_A and a predicted band position BP_P, for the offset control of the current block that has been subjected to deblocking, etc.; and may output the SAO parameters to the entropy encoding circuit 248. The SAO filter 255 may include a SAO parameter decision circuit 255-1 and a band position prediction circuit 255-2. The SAO parameter decision circuit 255-1 may determine the SAO type TYPE of the current block. For instance, the SAO parameter decision circuit 255-1 may determine the SAO type of the current block as either an edge offset (EO) type or a band offset (BO) type according to pixel value features in the current block.

Referring to FIGS. 3 and 5, among the blocks BL1 through BL6 that have been processed before, the first block BL1, the third block BL3, the fourth block BL4, and the fifth block BL5 may be the BO offset type according to the example illustrated in the figures; and the second block BL2 and the sixth block BL6 may be the EO offset type according to the illustrated example. The current block, i.e., the seventh block BL7 may be the BO type according to the illustrated example. Here, the EO type may refer to a method of adjusting an offset based on the orientation of an edge and the BO type may refer to a method of adjusting an offset based on the scale of a pixel value. While an example of a plurality of blocks being of the BO and EO types are illustrated in FIGS. 3 and 5, the example embodiments are limited thereto and individual blocks may be of either type.

Figure 6:
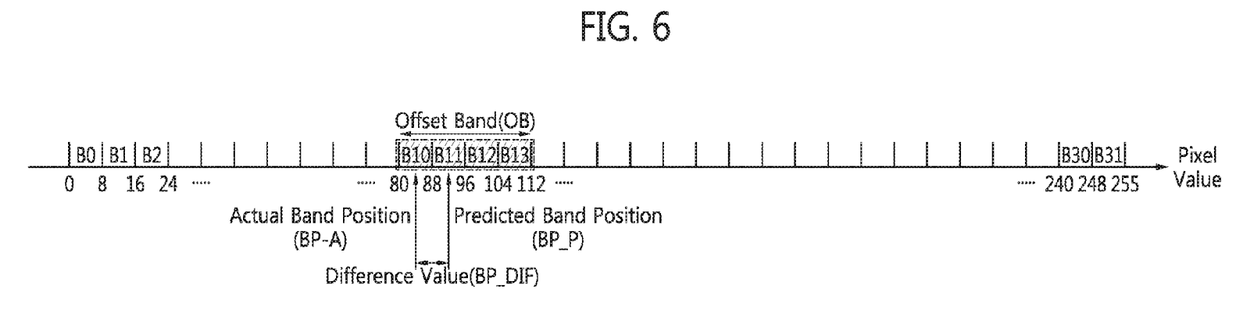
FIG. 6 is a diagram for explaining a procedure for determining a predicted band position for a band offset type according to some example embodiments of the inventive concepts.

FIG. 6 is a diagram for explaining a procedure for determining the predicted and/or estimated band position BP_P for a BO type according to some example embodiments of the inventive concepts. Referring to FIGS. 4 and 6, when the SAO type of the current block is determined as the BO type, the SAO parameter decision circuit 255-1 may determine offset bands OB of the current block and the offset value OFFS for each of the offset bands OB. The offset bands OB are a plurality of bands having a desired, improved, and/or optimal rate-distortion cost and may refer to a group of bands to which offset compensation will be applied in the current block. The offset OFFS may be a mean value of errors between the original pixels and the restored pixels in the current block.

Referring to FIG. 6, the full range of pixel values in the current block may be uniformly or non-uniformly divided into a plurality of bands. For instance, when a pixel value is expressed in eight bits, the full range of pixel values is 0 to 255 (e.g., $2^8$ values) and may be uniformly divided into, for example, 32 bands B0 through B31, but the example embodiments are limited to 32 bands and the pixel values may be divided into any number of bands based on whether they are uniformly or non-uniformly divided. According to this example, the 0th band B0 may include pixel values of 0 to 7; the first band B1 may include pixel values of 8 to 15;

and the k-th band may include pixel values of 8 k to 8 k+7, but other example embodiments may have more or less pixel value ranges for each band.

At this time, the SAO parameter decision circuit 255-1 may determine some of the bands as the offset bands OB. For instance, the SAO parameter decision circuit 255-1 may determine four consecutive bands (e.g., the 10th through 13th bands B10 through B13) as the offset bands OB. The SAO parameter decision circuit 255-1 may determine the offset OFFS for the offset bands OB.

For instance, the SAO parameter decision circuit 255-1 may determine a first offset value for the 10th band B10 including pixel values of, for example, 80 to 87, a second offset value for the 11th band B11 including pixel values of, for example, 88 to 95, a third offset value for the 12th band B12 including pixel values of, for example, 96 to 103, and a fourth offset value for the 13th band B13 including pixel values of, for example, 104 to 111.

The SAO parameter decision circuit 255-1 may also determine the actual band position BP_A indicating an actual position of the offset bands OB. For instance, when the 10th through 13th consecutive bands B10 through B13 are determined as the offset bands OB, as shown in FIG. 6, the SAO parameter decision circuit 255-1 may determine, as the actual band position BP_A of the current block, a band coming first in a direction in which an index of a band increases, that is, e.g., the leftmost 10th band B10 among the offset bands OB of FIG. 6.

Referring to FIGS. 4 through 6, the band position prediction circuit 255-2 may determine the predicted and/or estimated band position BP_P of the current block BL7. The band position prediction circuit 255-2 may determine one of the actual band positions of the previous blocks BL1 through BL6 processed prior to the current block BL7 as the predicted and/or estimated band position BP_P based on a band position table 255-3. For instance, the band position prediction circuit 255-2 may determine, as the predicted and/or estimated band position BP_P of the current block BL7, the actual band position of the fifth block BL5 which is the closest block to the current block BL7 in order of processing among the previous blocks BL1, BL3, BL4, and BL5 that have been processed as the BO type. In other words, the band position prediction circuit 255-2 may determine the 11th band B11 as the predicted and/or estimated band position BP_P of the current block BL7.

Additionally, the band position prediction circuit 255-2 may determine the predicted and/or estimated band position BP_P using a mean value of the actual band positions of the previous blocks, for example blocks BL1 through BL6, processed prior to the current block, for example BL7, based on the band position table 255-3. For instance, the band position prediction circuit 255-2 may determine the eighth band B8 as the predicted and/or estimated band position BP_P of the current block BL7 based on a mean value (=8) of the actual band positions of the previous blocks BL1, BL3, BL4, and BL5 processed as the BO type, according to this example.

Figure 7:
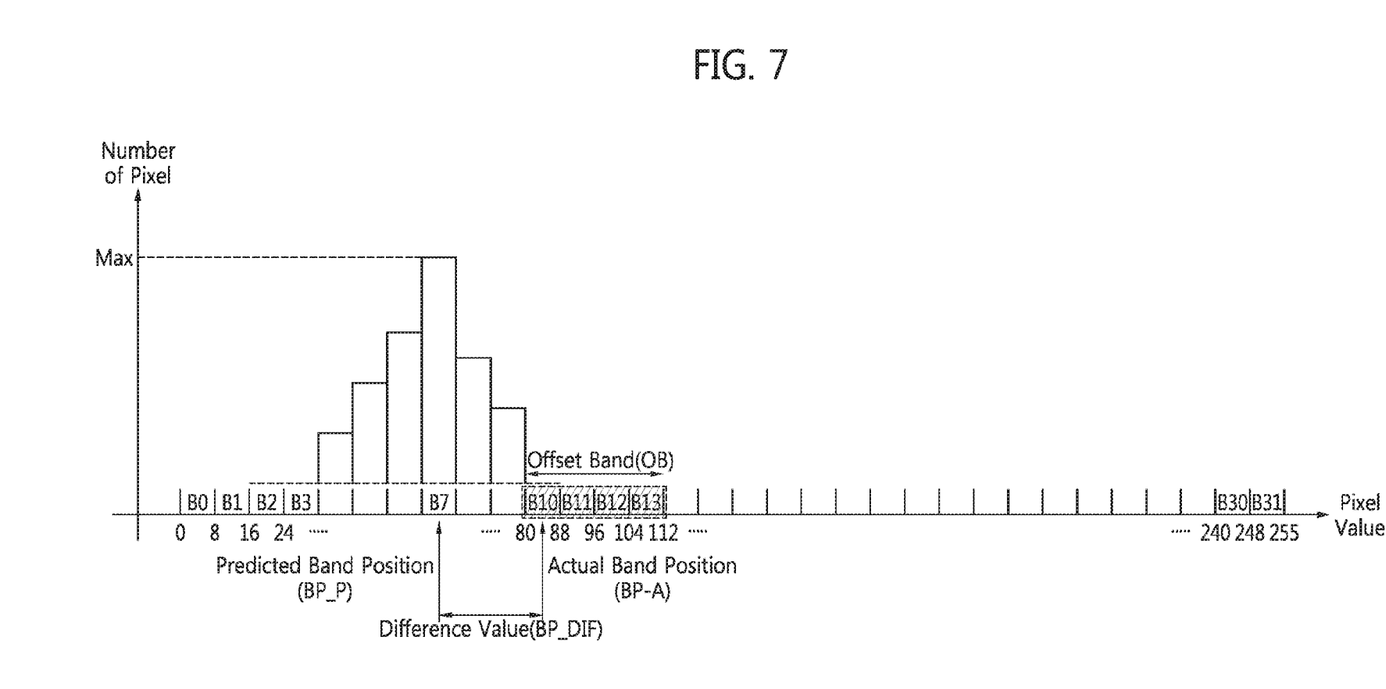
FIG. 7 is a diagram for explaining a procedure for determining a predicted band position for a band offset type according to other example embodiments of the inventive concepts.

FIG. 7 is a diagram for explaining a procedure for determining the predicted band and/or estimated position PB_P for the BO type according to other example embodiments of the inventive concepts. Referring to FIGS. 4 and 7, the band position prediction circuit 255-2 may determine the predicted and/or estimated band position BP_P using pixel values included in the current block BL7. The band position prediction circuit 255-2 may determine the predicted and/or estimated band position BP_P using the frequency of a pixel value in each band.

For instance, referring to FIG. 7, pixel values range from 0 to 255 and may be uniformly divided into 32 bands, like the example embodiment illustrated in FIG. 6. When a current block includes, for example, 16*16 pixels, each pixel may correspond to one of the bands according to a pixel value. At this time, the number of pixels having a certain pixel value may be calculated for each band and the seventh band BL7 having the maximum frequency of the pixel value may be determined as the predicted and/or estimated band position BP_P.

Additionally, the band position prediction circuit 255-2 may determine the predicted and/or estimated band position BP_P of a current block using, for example, the maximum, minimum, mean value, or other desired value, of pixel values of the current block.

Figure 8:
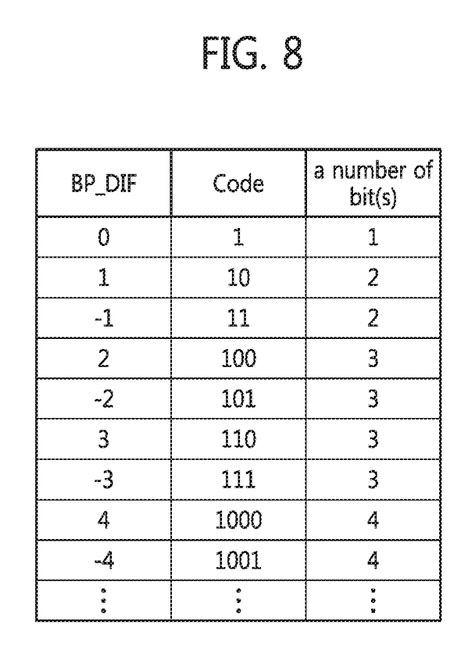
FIG. 8 is a diagram for explaining a procedure for encoding a SAO parameter according to some example embodiments of the inventive concepts.

FIG. 8 is a diagram for explaining a procedure for encoding a SAO parameter according to some example embodiments of the inventive concepts. Referring to FIGS. 4 through 8, the entropy encoding circuit 248 may include a SAO parameter encoding circuit 248-1. The SAO parameter encoding circuit 248-1 may encode SAO parameters, i.e., the SAO type TYPE, the offset OFFS, the difference value BP_DIF based on or between the actual band position BP_A and the predicted and/or estimated band position BP_P, provided from the SAO filter 255.

The SAO parameter encoding circuit 248-1 may also be provided with the actual band position BP_A of a current block together with the SAO parameters and may encode the actual band position BP_A using a fixed number of bits. For instance, the actual band position BP_A may be one of the 0th to 31st bands and may be encoded using five bits. In detail, when the actual band position BP_A of the current block, for example BL7, is the 10th band B10, the actual band position BP_A may be encoded into a 5-bit code, e.g., 01010.

The SAO parameter encoding circuit 248-1 may encode the difference value BP_DIF between the actual band position BP_A and the predicted band position BP_P of the current block using variable length coding. In other words, the BP_DIF value represents the difference of the actual band position BP_A and the predicted band position BP_P of the current block. The SAO parameter encoding circuit 248-1 may encode the difference value BP_DIF in a variable number of bits according to the difference value BP_DIF in connection with a variable length coding table, such as the coding table of FIG. 8 but the example embodiments are not limited thereto and may contain other code values and/or number of bit(s) representative of a respective difference value BP_DIF. For instance, referring to FIG. 8, when the difference value BP_DIF between the actual band position BP_A and the predicted band position BP_P is −1, the SAO parameter encoding circuit 248-1 may encode the difference value BP_DIF into a 2-bit code, e.g., 11. When the difference value BP_DIF between the actual band position BP_A and the predicted band position BP_P is 3, the SAO parameter encoding circuit 248-1 may encode the difference value BP_DIF into a 3-bit code, e.g., 110.

The variable length coding may refer to allocating a variable bit length for coding according to a value to be coded. The variable length coding may be Huffman coding, Lempel-Ziv coding, arithmetic coding, Shannon-Fano coding, exponential-Golomb coding, etc., but is not restricted thereto and may use any suitable coding protocol.

Figure 9:
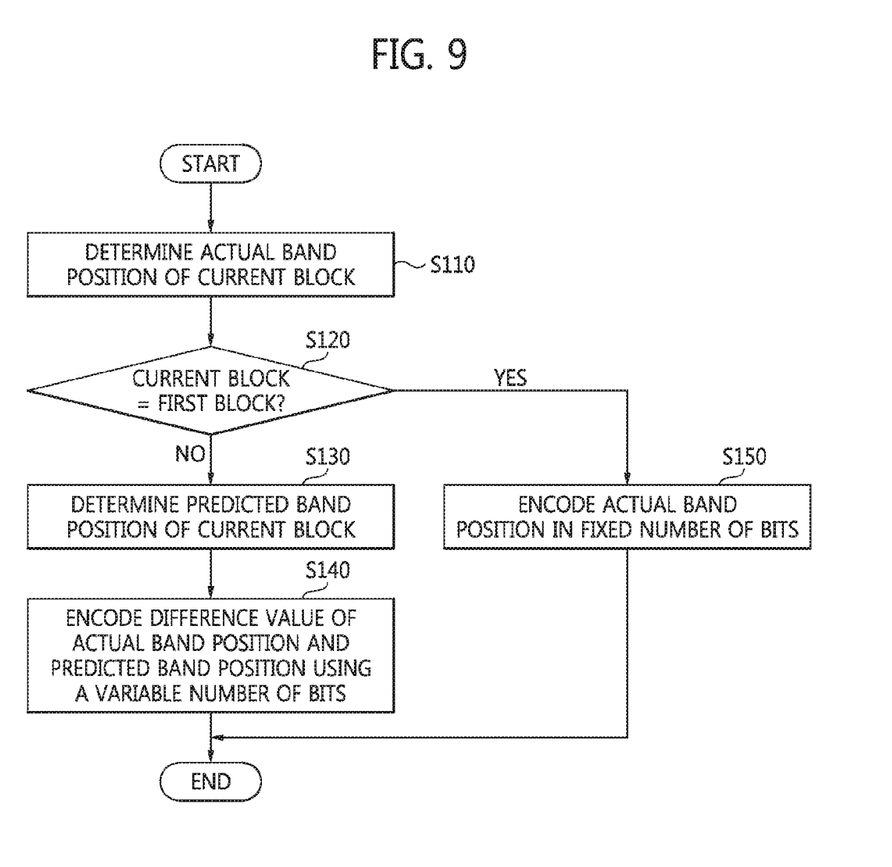
FIG. 9 is a flowchart of a method of operating an encoder according to some example embodiments of the inventive concepts.

FIG. 9 is a flowchart of a method of operating an encoder according to some example embodiments of the inventive concepts. Referring to FIGS. 4 through 9, the SAO parameter decision circuit 255-1 of the SAO filter 255 may determine a SAO type for the offset control of a current block. In other words, the SAO parameter decision circuit 255-1 may determine the SAO type as a BO type or an EO type according to the pixel value features of the current block.

When the SAO type is determined as the BO type, the SAO parameter decision circuit 255-1 may determine the offset bands OB of the current block and an offset value for each of the offset bands OB. The SAO parameter decision circuit 255-1 may determine the actual band position BP_A of the current block, which is related to the actual positions of the offset bands OB, in operation S110.

The offset bands OB may be consecutive bands that have a desired, improved, and/or optimal rate-distortion cost among a plurality of bands. For example, the predicted band position BP_P may be a band coming first in a direction in which an index increases among the offset bands OB. The SAO parameter decision circuit 255-1 may determine whether there is any actual band position of blocks that have been processed prior to the current block in operation S120, e.g., determine if the current block is the first block to be processed or not. When no actual band position of blocks have been processed prior to the current block (e.g., the current block is the first block to be processed), the SAO parameter encoding circuit 248-1 may encode the actual band position BP_A of the current block, which has been determined in operation S110, using a fixed number of bits in operation S150.

When there one or more actual band position of blocks have been processed prior to the current block (e.g., the current block is the second or later block to be processed), the band position prediction circuit 255-2 may determine a predicted band position of the current block in operation S130. In detail, the band position prediction circuit 255-2 may determine at least one of the actual band positions of the previous blocks BL1 through BL6 processed prior to the current block BL7 as the predicted band position BP_P based on the band position table 255-3. For instance, the band position prediction circuit 255-2 may determine, as the predicted band position BP_P of the current block BL7, the actual band position of the fifth block BL5 is the closest band position to the current block BL7 in order of processing among the previous blocks BL1, BL3, BL4, and BL5 that have been processed as the BO type. In other words, the band position prediction circuit 255-2 may determine or choose the 11th band B11 as the predicted band position BP_P of the current block BL7.

Additionally, the band position prediction circuit 255-2 may determine the predicted band position BP_P using a mean value of the actual band positions of the respective previous blocks processed prior to the current block, e.g., the previous blocks may be BL1 through BL6 and the current block BL7 based on the band position table 255-3.

The SAO parameter encoding circuit 248-1 may encode the difference value BP_DIF between (e.g., the difference value of) the actual band position BP_A and the predicted band position BP_P using variable length coding in operation S140. In other words, the SAO parameter encoding circuit 248-1 may encode the difference value BP_DIF using a variable number of bits according to the difference value BP_DIF.

The variable length coding may refer to allocating a variable bit length for coding according to a value to be coded. The variable length coding may be Huffman coding, Lempel-Ziv coding, arithmetic coding, Shannon-Fano coding, exponential-Golomb coding, etc., but is not restricted thereto.

As described above, according to some example embodiments of the inventive concepts, a method of operating an encoder performs prediction of a band position and uses variable length coding, thereby providing a high compression ratio.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of operating an encoder, the method comprising:
   determining, using the encoder, a predicted band position of a first block included in a video frame;
   determining, using the encoder, a first actual band position of the first block; and
   coding, using the encoder, a difference value of the predicted band position and the first actual band position.

2. The method of claim 1, wherein the determining the predicted band position comprises determining a second actual band position of a second block processed prior to a processing of the first block as the predicted band position.

3. The method of claim 2, wherein the second block is closest to the first block based on an order of processing among one or more blocks processed prior to the processing of the first block.

4. The method of claim 1, wherein the determining the predicted band position comprises determining the predicted band position using a mean value of actual band positions of one or more blocks processed prior to the first block.

5. The method of claim 1, wherein the determining the predicted band position comprises:
   dividing a full range of pixel values of the first block into a plurality of bands;
   calculating a frequency of a desired pixel value in each of the plurality of bands; and
   determining a band having a maximum frequency of the desired pixel value among the plurality of bands as the predicted band position.

6. The method of claim 1, wherein the determining the predicted band position comprises determining the predicted band position using one of maximum, minimum, or mean values of at least one pixel value associated with the first block.

7. The method of claim 1, wherein the coding the difference value comprises coding the difference value using a first number of bits which is based on the difference value.

8. The method of claim 1, further comprising:
   determining, using the encoder, whether there is a second actual band position of a second block processed prior to the first block; and
   coding, using the encoder, the first actual band position in a second number of bits corresponding to a result of the determination of the second actual band position.

9. A method of operating an encoder on a system on chip, the system on chip including the encoder and a processor, the method comprising:
   receiving, using the encoder, a video frame from the processor, the video frame including a first block and a second block;
   determining, using the encoder, a first band position of the first block; and
   coding, using the encoder, a difference value of a second band position of the second block and the first band position using a first number of bits, the first number of bits varying in accordance with the difference value.

10. The method of claim 9, further comprising:
    coding, using the encoder, the first band position using a second number of bits.

11. The method of claim 9, wherein when the first block is equal to the second block, the determining the first band position comprises predicting the first band position using one or more pixel values associated with the second block.

12. The method of claim 11, wherein the predicting the first band position is performed using at least one among a maximum value of the one or more pixel values, a minimum value of the one or more pixel values, a mean value of the one or more pixel values, and a frequency of a desired value among the one or more pixel values.

* * * * *